(12) United States Patent
Roberson (10) Patent No.: US 10,082,018 B2
(45) Date of Patent: Sep. 25, 2018

(54) DOWNHOLE COMMUNICATIONS USING FREQUENCY GUARD BANDS

(71) Applicant: Halliburton Energy Services, Inc., Houston, TX (US)

(72) Inventor: Mark W. Roberson, Cary, NC (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/541,791

(22) PCT Filed: Mar. 11, 2015

(86) PCT No.: PCT/US2015/019861
§ 371 (c)(1),
(2) Date: Jul. 6, 2017

(87) PCT Pub. No.: WO2016/144346
PCT Pub. Date: Sep. 15, 2016

(65) Prior Publication Data
US 2018/0003037 A1    Jan. 4, 2018

(51) Int. Cl.
*E21B 47/12* (2012.01)
*E21B 47/14* (2006.01)
*E21B 33/14* (2006.01)
*E21B 47/06* (2012.01)
*E21B 49/08* (2006.01)

(52) U.S. Cl.
CPC ............ *E21B 47/12* (2013.01); *E21B 47/122* (2013.01); *E21B 47/14* (2013.01); *E21B 33/14* (2013.01); *E21B 47/06* (2013.01); *E21B 47/065* (2013.01); *E21B 49/08* (2013.01)

(58) Field of Classification Search
CPC ........ E21B 47/12; E21B 47/122; E21B 47/14; E21B 47/06; E21B 47/065; E21B 33/14; E21B 49/08
See application file for complete search history.

(56) References Cited

U.S. PATENT DOCUMENTS

| 4,390,975 A | 6/1983 | Shawhan |
| 5,148,408 A | 9/1992 | Matthews |
| 2004/0252748 A1 | 12/2004 | Gleitman et al. |
| 2010/0002675 A1 | 1/2010 | Fu et al. |
| 2010/0194586 A1 | 8/2010 | Tjhang et al. |
| 2010/0223988 A1 | 9/2010 | Crow et al. |

(Continued)

FOREIGN PATENT DOCUMENTS

WO    2014100272    6/2014

OTHER PUBLICATIONS

International Patent Application No. PCT/US2015/019861, "International Search Report and Written Opinion", dated Oct. 14. 2015, 14 pages.

*Primary Examiner* — Leon Flores
(74) *Attorney, Agent, or Firm* — Kilpatrick Townsend & Stockton LLP (57) ABSTRACT

A system that is positionable in a wellbore can include a chain of transceivers that are positionable external to a casing string. Each transceiver in the chain of transceivers can be operable to transmit a wireless signal using a separate frequency guard band that is assigned to that transceiver and to receive wireless signals using another frequency guard band assigned to a prior transceiver in the chain of transceivers.

20 Claims, 6 Drawing Sheets

(56) References Cited

U.S. PATENT DOCUMENTS

2014/0246237 A1 9/2014 Prammer
2015/0354351 A1* 12/2015 Morrow .................. E21B 47/01
367/82

* cited by examiner

DOWNHOLE COMMUNICATIONS USING FREQUENCY GUARD BANDS

CROSS-REFERENCE TO RELATED APPLICATIONS

This is a U.S. national phase under 35 U.S.C. 371 of International Patent Application No. PCT/US2015/019861 titled "Downhole Communications Using Frequency Guard Bands" and filed Mar. 11, 2015, the entirety of which is incorporated herein by reference.

TECHNICAL FIELD

The present disclosure relates generally to devices for use in well systems. More specifically, but not by way of limitation, this disclosure relates to downhole communications using frequency guard bands.

BACKGROUND

A well system (e.g., an oil or gas well for extracting fluid or gas from a subterranean formation) can include various sensors. For example, a well system can include sensors for measuring well system parameters, such as temperature, pressure, resistivity, or sound levels. It may be desirable to transmit sensor data to a well operator (e.g., typically at the surface of the well system). It can be challenging to communicate data from the sensors to the well surface efficiently.

DETAILED DESCRIPTION

Certain aspects and features of the present disclosure are directed to downhole communications using frequency guard bands. The downhole communications can be wireless communications (e.g., acoustic, ultrasonic, pressure wave, magnetic, electrical, and/or radio frequency communications) between a transceiver positioned external to a casing string in a wellbore and a receiver (e.g., another transceiver or a computing device positioned in the well system). The transceiver can be positioned external to the casing string if the transceiver is positioned on or external to an outer diameter or outer wall of the casing string. The transceiver can be programmed to wirelessly communicate (e.g., transmit and receive wireless signals) using a frequency guard band. A frequency guard band can include a range of frequencies between two adjacent frequency bands for separating the adjacent frequency bands. The frequency guard band can reduce interference (e.g., crosstalk) between wireless signals transmitted via the adjacent frequency bands. In some examples, the transceiver can be programmed to wirelessly communicate using a particular frequency within the frequency guard band.

The guard frequency band can be assigned to the transceiver. For example, the transceiver can be remotely programmed to wirelessly communicate using the frequency guard band subsequent to being positioned in the wellbore. In some examples, the transceiver can be remotely programmed to wirelessly communicate using a particular frequency within the frequency guard band. For example, a computing device (e.g., a computing device at the well surface) can wirelessly transmit a control signal to the transceiver. The transceiver can select a frequency guard band from among multiple frequency bands (e.g., frequency guard bands) based on the control signal. The transceiver can also select a particular frequency from among multiple available frequencies within the frequency guard band based on the control signal.

The transceiver can be programmed to wirelessly communicate using the frequency guard band prior to being positioned in the wellbore. In some examples, the transceiver can also be programmed, prior to being positioned in the wellbore, to wirelessly communicate using a particular frequency within the frequency guard band. For example, the transceiver can be programmed during manufacturing or distribution (e.g., while in a manufacturer's factory), at a well site, or while in transit to the well site. The transceiver can be programmed before, during, or after various well operations, such as during pumping operations. The transceiver can be programmed to wirelessly communicate using a frequency guard band selected from among multiple frequency bands. The transceiver can also be programmed to wirelessly communicate using a particular frequency within the frequency guard band, which can be selected from among multiple available frequencies within the frequency guard band.

In some examples, the transceiver can be programmed to wirelessly communicate at an assigned time, for a specific duration of time, or both. For example, the computing device can wirelessly transmit a control signal to the transceiver. The transceiver can select a time of day to wirelessly communicate based on the control signal. The transceiver can additionally or alternatively select a duration for which to wirelessly communicate based on the control signal.

In some examples, the transceiver can include or be electrically coupled to sensors for detecting information about the environment in the wellbore. The transceiver can detect and wirelessly communicate information about the environment in the wellbore using a frequency guard band. Examples of the information can include a temperature, pressure, and sound level within the wellbore; the presence or absence of a particular fluid (e.g., water, mud, a hydrocarbon, spacer fluid, or cement) at a particular location in the wellbore; a type of fluid in the wellbore (e.g., whether the fluid includes a hydrocarbon, mud, cement, water, spacer fluid, or any combination of these); and a physical state (e.g., solid, liquid, or gas) of a substance (e.g., cement) in the wellbore.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
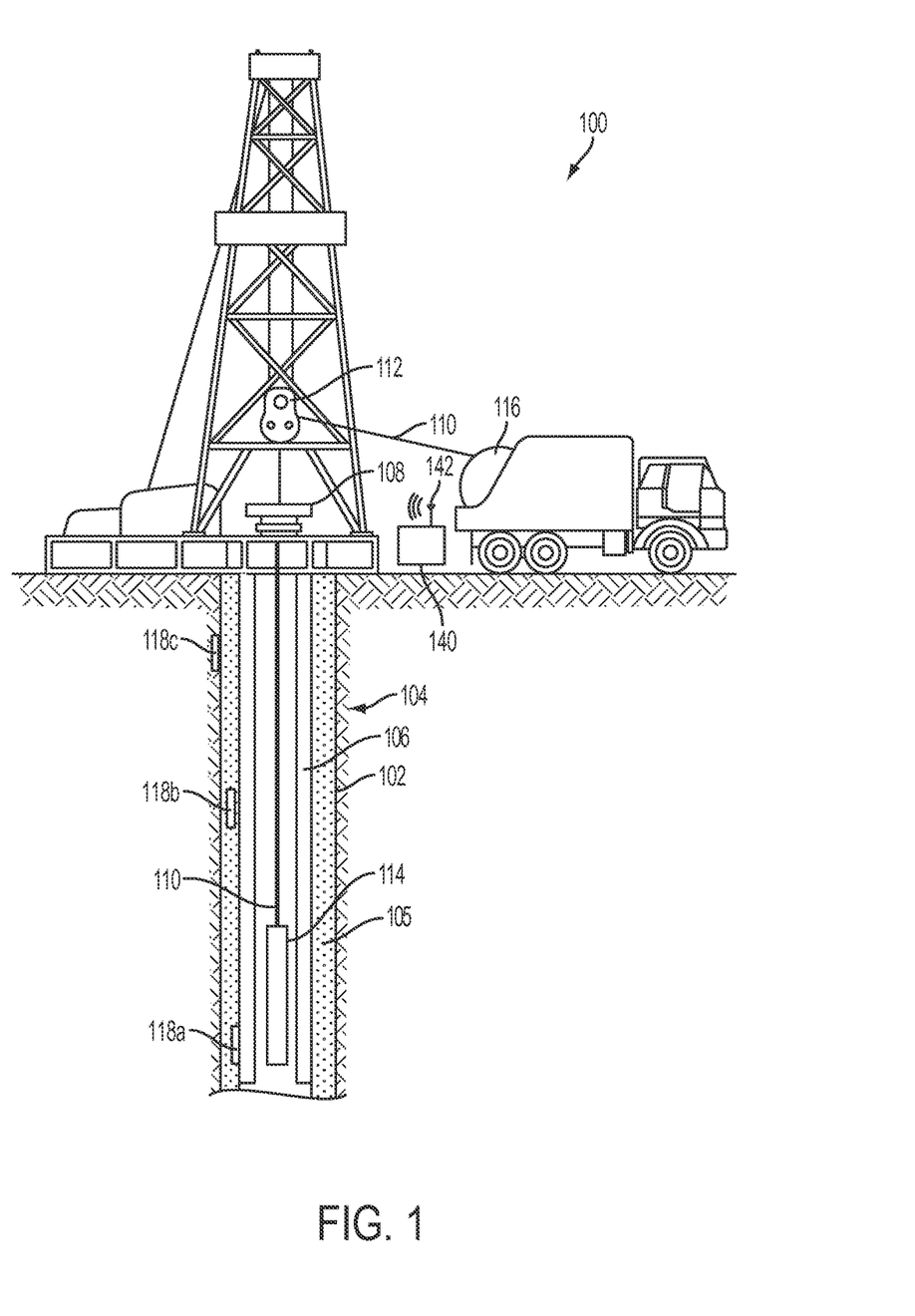
FIG. 1 is a cross-sectional view of an example of a well system that includes a system for downhole communications using frequency guard bands.

FIG. 1 is a cross-sectional view of a well system 100 that includes a system for downhole communications using frequency guard bands. The well system 100 includes a wellbore 102 extending through various earth strata. The wellbore 102 extends through a hydrocarbon bearing subterranean formation 104. The well system 100 can also include a casing string 106 that extends from the surface 108 to the subterranean formation 104. The casing string 106 can provide a conduit through which formation fluids, such as production fluids produced from the subterranean formation 104, can travel from the wellbore 102 to the surface 108. The casing string 106 can be coupled to the walls of the wellbore 102 via cement. For example, a cement sheath 105 can be positioned (e.g., formed) between the casing string 106 and the walls of the wellbore 102 for coupling the casing string 106 to the wellbore 102.

The well system 100 can also include at least one well tool 114 (e.g., a measuring-while-drilling ("MWD") tool, a logging-while-drilling ("LWD") tool, or a wireline formation-testing tool). The well tool 114 can be coupled to a wireline 110, slickline, or coiled tubing that can be deployed into the wellbore 102. The wireline 110, slickline, or coiled tubing can be guided into the wellbore 102 using, for example, a guide 112 or winch. In some examples, the wireline 110, slickline, or coiled tubing can be wound around a reel 116.

The well system 100 can include a computing device 140. The computing device 140 can be positioned at the surface 108 of the wellbore, below ground, or offsite. The computing device 140 can include a processor interfaced with other hardware via a bus. A memory, which can include any suitable tangible (and non-transitory) computer-readable medium, such as RAM, ROM, EEPROM, or the like, can embody program components that configure operation of the computing device 140. In some aspects, the computing device 140 can include input/output interface components (e.g., a display, keyboard, touch-sensitive surface, and mouse) and additional storage.

The computing device 140 can include a communication device 142. The communication device 142 can represent one or more of any components that facilitate a network connection. In the example shown in FIG. 1, the communication device 142 is wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In some examples, the communication device 142 can use acoustic waves, mud pulses, surface waves, vibrations, optical waves, or induction (e.g., magnetic induction) for engaging in wireless communications. In other examples, the communication device 142 can be wired and can include interfaces such as Ethernet, USB, IEEE 1394, or a fiber optic interface.

The well system 100 can also include transceivers 118a-c. In some examples, each of the transceivers 118a-c can be positioned on, partially embedded within, or fully embedded within the casing string 106, the cement sheath, or both. In some examples, the transceivers 118a-c can be positioned externally to the casing string 106. For example, the transceiver 118a can be positioned on an outer housing of the casing string 106, the transceiver 118b can be positioned within the cement sheath 105, and the transceiver 118 can be positioned within the subterranean formation 104 (e.g., by using a flex centralizer). Positioning the transceivers 118a-c externally to the casing string 106 can be advantageous over positioning the transceivers 118a-c elsewhere in the well system 100, such as within the casing string 106, which can affect a drift diameter of the casing string 106. Additionally, positioning the transceivers 118a-c externally to the casing string 106 can allow the transceivers 118a-c to more accurately and efficiently detect characteristics of the subterranean formation 104, the cement sheath 105, and the casing string 106.

In some examples, the transceivers 118a-c can be transceivers for transmitting wireless communications using acoustic wave, pressure wave, magnetic, electrical, or radio frequency communications. The transceivers 118a-c can wirelessly communicate (e.g., transmit and receive wireless signals) using frequency bands. In some examples, the transceivers 118a-c can wirelessly communicate using ultrasound signals or acoustic signals. The transceivers 118a-c can wirelessly communicate information (e.g., information included in a modulated ultrasound signal or included in a modulated acoustic signal) in segments or "hops" to a destination (e.g., uphole or downhole). For example, a transceiver 118a can wirelessly communicate information to another transceiver 118b (e.g., positioned farther uphole), which can relay the information to still another transceiver (e.g., transceiver 118c positioned even farther uphole), and so on. As another example, one transceiver 118b can wirelessly communicate information to another transceiver 118c, which can relay the information to a destination (e.g., the computing device 140).

Figure 2:
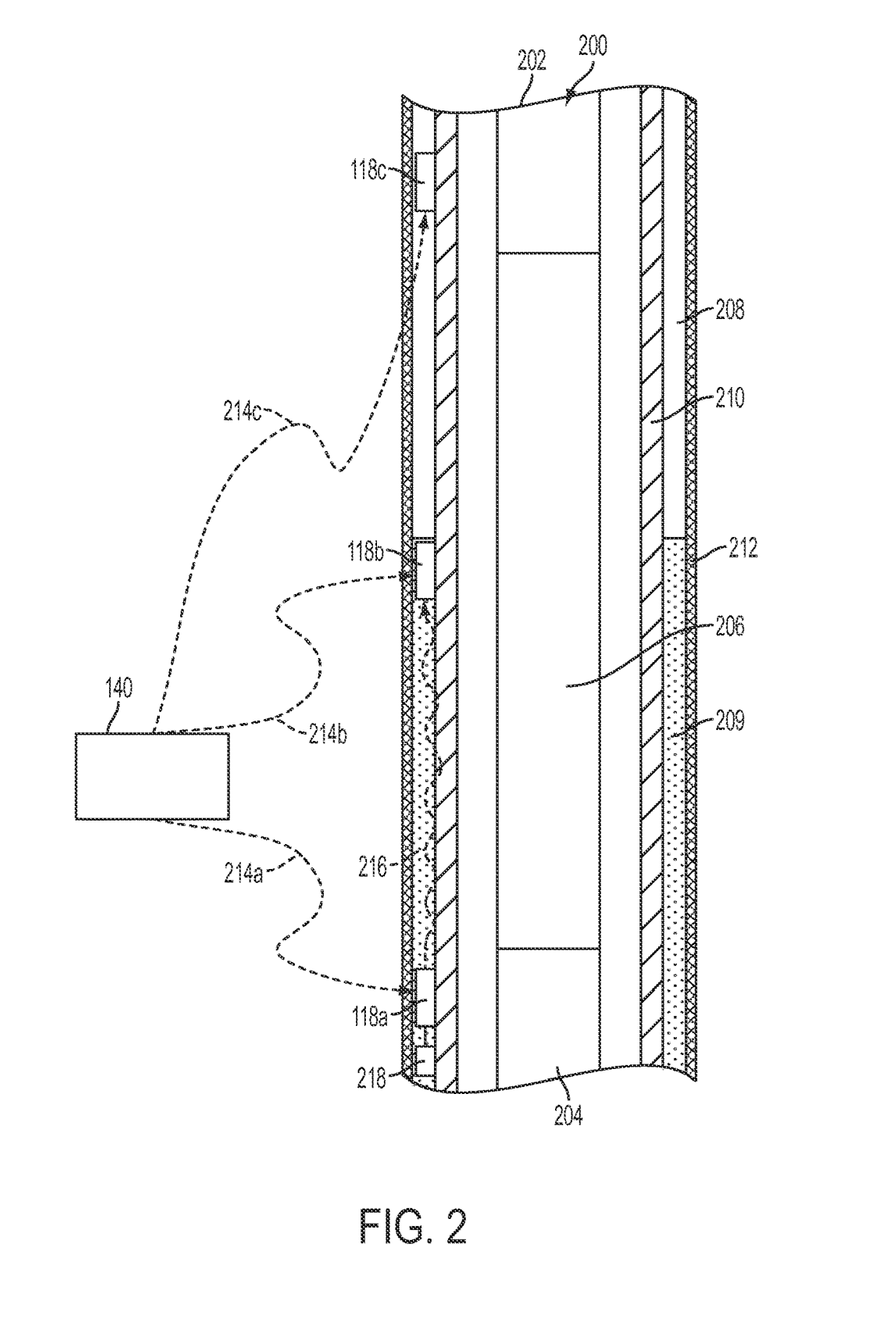
FIG. 2 is a cross-sectional side view of an example of part of a well system for downhole communications using frequency guard bands that includes transceivers.

FIG. 2 is a cross-sectional side view of an example of part of a well system for downhole communications using frequency guard bands that includes transceivers 118a-c. The transceivers 118a-c can be positioned on or external to a casing string 210 in a wellbore. For example, the transceiver 118a can be positioned coaxially around an outer housing of the casing string 210. In some examples, a well tool 200 can be positioned within the casing string 210. The well tool 200 can include multiple subsystems 202, 204, 206.

Fluid 209 (e.g., cement, mud, a spacing fluid, or a hydrocarbon) can be positioned in a space 208 between the casing string 210 and the subterranean formation 212. For example, a fluid 209 containing cement can be pumped into the space 208 during cementing operations. The fluid 209, however, may not fill the full longitudinal length of the space 208. This can generate an annulus between a portion of the casing string 210 and the subterranean formation 212.

In some examples, each transceiver 118a-c can include or be electrically coupled to a sensor. In the example shown in FIG. 2, the transceiver 118a is electrically coupled to a sensor 218 by a wire. Examples of the sensor 218 can include a pressure sensor, a temperature sensor, a microphone, an accelerometer, a depth sensor, a resistivity sensor, a vibration sensor, an ultrasonic transducer, a fluid analyzer or detector, and a RFID reader. In some examples, the sensor 218 can detect the presence of, absence of, or a characteristic of the fluid 209.

In some examples, the sensor 218 can transmit sensor signals to a processor (e.g., a processor associated with the transceiver 118a). The sensor signals can be representative of sensor information. The processor can receive the sensor signals and cause the transceiver 118a to communicate the sensor information (e.g., to another transceiver 118b). For example, the processor can transmit signals to an antenna to generate wireless signals 216 representative of sensor information. In some examples, the sensor 218 can additionally or alternatively transmit sensor signals to an electrical circuit. The electrical circuit can receive the sensor signal and perform one or more functions to cause the transceiver 118a to generate wireless signals 216.

The transceivers 118a-c can wirelessly communicate via frequency guard bands. Each of the transceivers 118a-c can be programmed to wirelessly communicate using a particular frequency guard band. For example, transceiver 118a can be programmed to wirelessly communicate with transceiver 118b using one frequency guard band. Transceiver 118b can be programmed to wirelessly communicate with transceiver 118c using another frequency guard band. In some examples, the transceivers 118a-c can be programmed to wirelessly communicate using a particular frequency within a specific frequency guard band. For example, transceiver 118a can be programmed to wirelessly communicate with transceiver 118b using a frequency within the frequency guard band. Transceiver 118b can be programmed to wirelessly communicate with transceiver 118c using another frequency within the frequency guard band.

In some examples, the transceivers 118a-c can wirelessly communicate via the frequency guard bands at a particular time. Each of the transceivers 118a-c can be programmed to wirelessly communicate using a particular frequency guard band at a particular time. For example, the transceiver 118a can be programmed to wirelessly communicate with transceiver 118b using one frequency guard band at 9:00 AM. Transceiver 118b can be programmed to wirelessly communicate with transceiver 118c using another frequency guard band at 9:05 AM. In some examples, the transceivers 118a-c can additionally or alternatively be programmed to wirelessly communicate using a frequency guard band for a specific duration of time. For example, the transceiver 118a can be programmed to wirelessly communicate with transceiver 118b using a frequency guard band for 100 milliseconds (ms). As another example, transceiver 118b can be programmed to wirelessly communicate with transceiver 118c for 50 ms.

In some examples, the transceivers 118a-c can be remotely programmed by the computing device 140 and while positioned in the wellbore. For example, the computing device 140 can wirelessly transmit respective control signals 214a-c to the transceivers 118a-c. Each of the transceivers 118a-c can determine a specific frequency guard band to use for wireless communication based on the respective control signals 214a-c. In one example, each of the transceivers 118a-c can select a frequency guard band from among multiple available frequency bands based on respective control signals 214a-c.

In some examples, each of the transceivers 118a-c can determine a particular frequency within a frequency guard band to use for wireless communication based on the respective control signals 214a-c. For example, each of the transceivers 118a-c can select a particular frequency from among multiple available frequencies within a frequency guard band based on respective control signals 214a-c.

Figure 3:
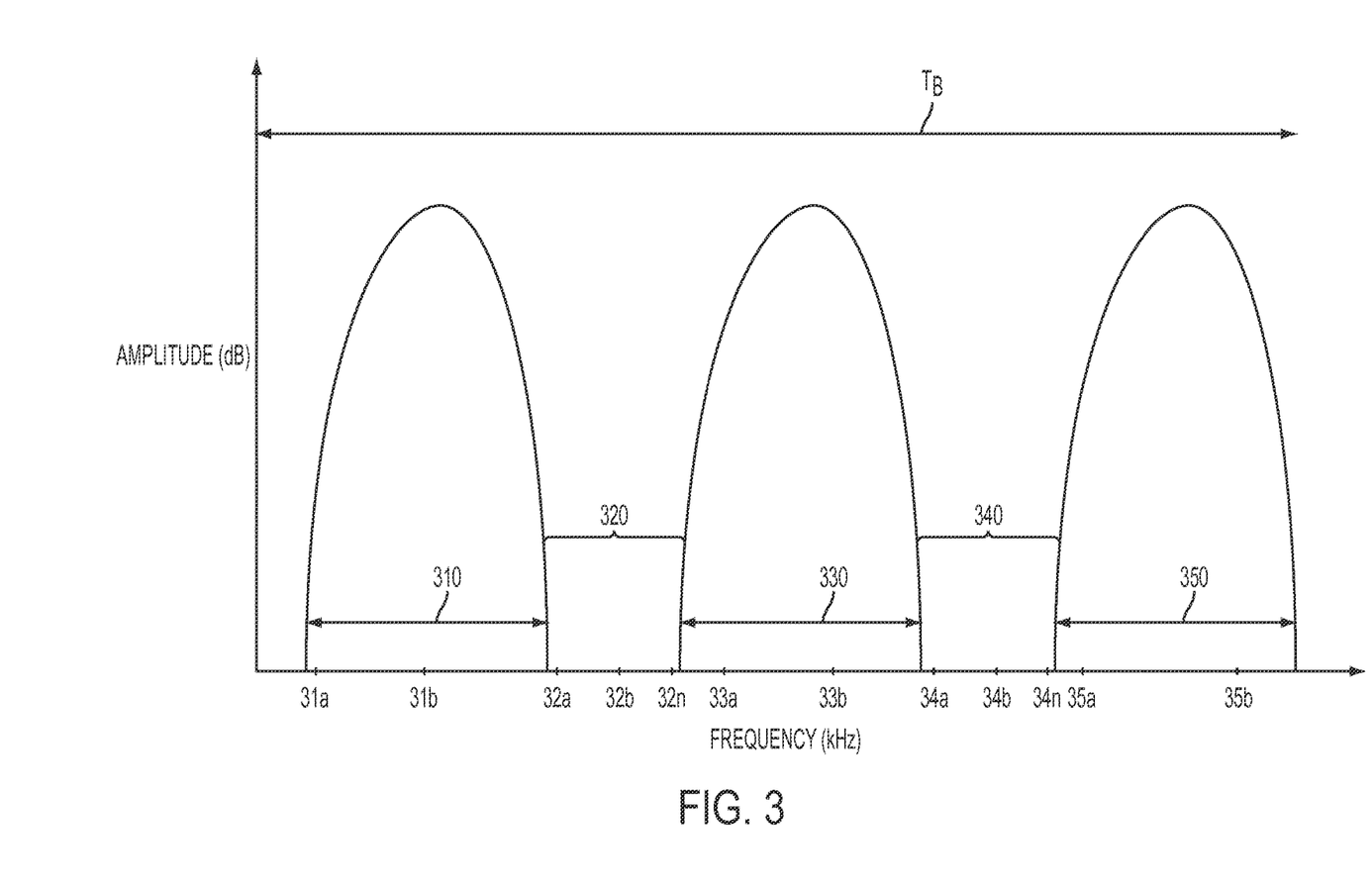
FIG. 3 is a graph depicting an example of alternating frequency bands and frequency guard bands.

FIG. 3 is a graph depicting an example of alternating frequency bands 310, 330, 350 and frequency guard bands 320, 340. The graph shows a total bandwidth $T_B$ available for wireless communications, which is divided into a series of frequency bands 310, 330, 350. Each frequency band 310, 330, 350 can include a specific range of frequencies. For example, frequency band 330 includes the range of frequencies between frequency 32n and frequency 34a. In some examples, a transceiver can use one or more frequencies 31a, 31b in a frequency band 310 for wireless communications.

The total bandwidth $T_B$ can also include multiple frequency guard bands 320, 340. Each frequency guard band 320, 340 can include a range of frequencies. For example, frequency guard band 320 can include a range of frequencies from 32a to 32n. Frequency guard band 340 can include a range of frequencies from 34a to 34n. The frequency guard bands can be between two adjacent frequency bands to separate the two adjacent frequency bands. For example, a frequency guard band 320 can be between two adjacent frequency bands 310, 330. The frequency guard band 320 can separate the adjacent frequency bands 310, 330. This may reduce interference among wireless communications transmitted using the adjacent frequency bands 310, 330. In some examples, another frequency guard band 340 can be between and separate frequency band 330 and frequency band 350. The frequency guard band 340 can separate frequency band 330 and frequency band 350. This may reduce interference among wireless communications transmitted using the adjacent frequency bands 330, 350.

In some examples, a transceiver (e.g., the transceiver 118a of FIG. 2) can be remotely programmed (e.g., by the control signal 214a from the computing device 140 of FIG. 2), subsequent to entering a wellbore, to wirelessly communicate over a specific frequency guard band 320, 340. For example, the transceiver can be remotely programmed to wirelessly communicate using the frequency guard band 320. In some examples, the transceiver can be remotely programmed to wirelessly communicate via a particular frequency within a specific frequency guard band. For example, the transceiver can be remotely programmed to wirelessly communicate using the frequency 32b within the frequency guard band 320. In some examples, a transceiver can be programmed, prior to entering the wellbore, to wirelessly communicate using a specific frequency guard band 320, 340. For example, the transceiver can be programmed prior to entering the wellbore, to wirelessly communicate using the frequency guard band 320. The transceiver can also be programmed, prior to entering the wellbore, to wirelessly communicate using a particular frequency within a specific frequency guard band. For example, the transceiver can be programmed, prior to entering the wellbore, to wirelessly communicate using the frequency 32b within the frequency guard band 320.

In some examples, multiple transceivers can be programmed to wirelessly communicate using different frequency guard bands. For example, one set of transceivers (e.g., transceivers 118a, 118b of FIG. 1) can be programmed to wirelessly communicate over frequency guard band 320. Another set of transceivers (e.g., transceivers 118b, 118c of FIG. 1) can be programmed to wirelessly communicate over another frequency guard band 340.

In some examples, each transceiver can be programmed to wirelessly communicate using a particular frequency within the same frequency guard band. For example, one transceiver (e.g., transceiver 118a of FIG. 1) can be programmed to wirelessly communicate using frequency 32a within guard band 320 and another transceiver can be programmed to wirelessly communicate using frequency 32b within guard band 320. In this manner, multiple transceivers can wirelessly communicate using a single guard band 320 while minimizing interference among wireless transmissions.

Figure 4:
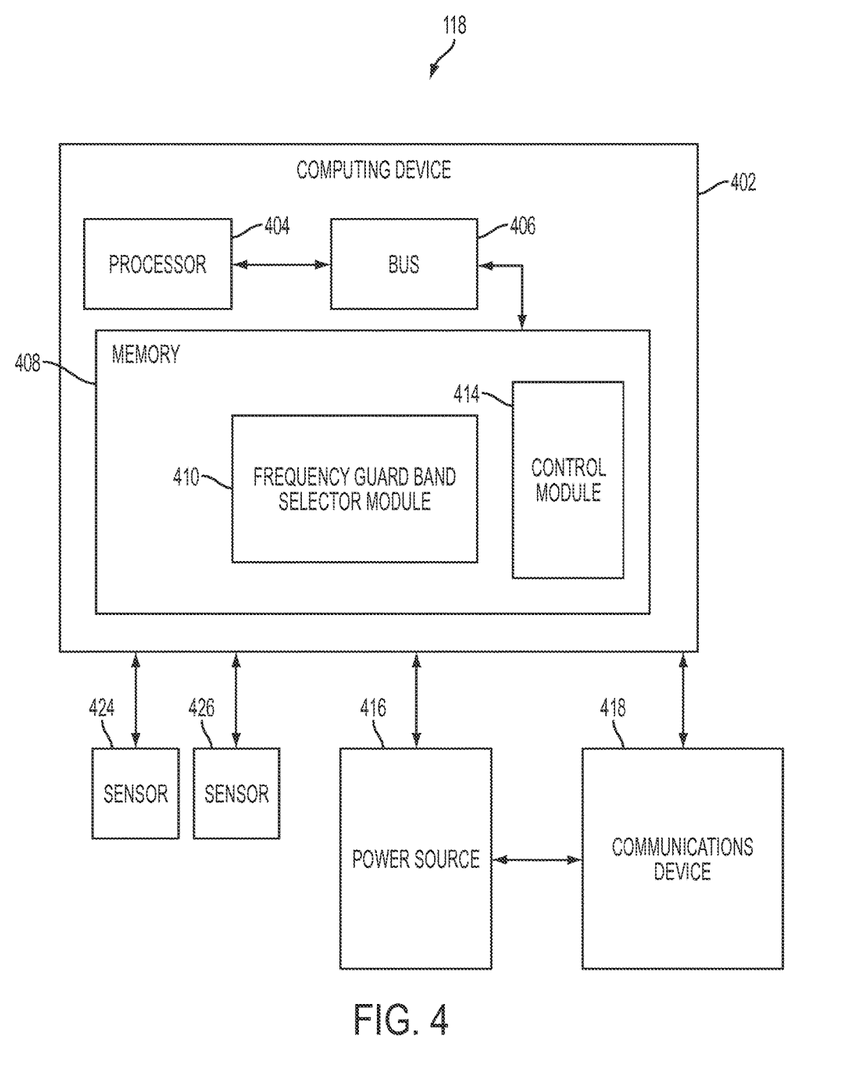
FIG. 4 is a block diagram of an example of a transceiver for implementing downhole communications using frequency guard bands.

FIG. 4 is a block diagram of an example of a transceiver 118 for implementing downhole communications using frequency guard bands. In some examples, the components shown in FIG. 4 (e.g., the computing device 402, power source 416, sensors 424, sensor 326, and communications device 418) can be integrated into a single structure. For example, the components can be within a single housing or chassis. In other examples, the components shown in FIG. 4 can be distributed (e.g., in separate housings) and in electrical communication with each other.

The transceiver 118 can include a computing device 402. The computing device 402 can include a processor 404, a memory 408, and a bus 406. The processor 404 can execute one or more operations for operating the transceiver 118. The processor 404 can execute instructions stored in the memory 408 to perform the operations. The processor 404 can include one processing device or multiple processing devices. Non-limiting examples of the processor 404 include a Field-Programmable Gate Array ("FPGA"), an application-specific integrated circuit ("ASIC"), a microprocessor, etc.

The processor 404 can be communicatively coupled to the memory 408 via the bus 406. The memory 408 may include any type of memory device that retains stored information when powered off. Non-limiting examples of the memory 408 include electrically erasable and programmable read-only memory ("EEPROM"), flash memory, or any other type of non-volatile memory. In some examples, at least some of the memory 408 can include a computer-readable medium from which the processor 404 can read the instructions. The computer-readable medium can include electronic, optical, magnetic, or other storage devices capable of providing the processor 404 with computer-readable instructions or other program code. Non-limiting examples of a computer readable-medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The memory 408 can include various modules 410, 414 for enabling downhole communications using frequency guard bands. In some examples, the memory 408 can include a frequency guard band selector module 410. The frequency guard band selector module 410 can include instructions for causing the transceiver 118 to wirelessly communicate over a specific frequency guard band. In some examples, the frequency guard band selector module 410 can include instructions for causing the transceiver 118 to select the frequency guard band from among multiple available frequency bands. For example, the frequency guard band selector module 410 can include instructions for causing the transceiver to select a frequency guard band ranging from 70 kHz to 80 kHz. In some examples, the frequency guard band selector module 410 can cause the transceiver to select a specific frequency guard band from among multiple frequency guard bands.

In some examples, the frequency guard band selector module 410 can include instructions for causing the transceiver 118 to select a particular frequency within a frequency guard band. For example, the frequency guard band selector module 410 can include instructions for causing the transceiver 118 to select the frequency 75 kHz in a frequency guard band ranging from 70 kHz to 80 kHz. The frequency guard band selector module 410 can cause the transceiver 118 to select the particular frequency from among multiple available frequencies within the frequency guard band.

In some examples, the frequency guard band selector module 410 can include a lookup table in which control signal information (e.g., transmitted by the computing device 140 of FIG. 1) is correlated to a frequency guard band. For example, the lookup table can include a column that has characteristics (e.g., amplitude, frequency, waveform, and duration) of a control signal or information carried by a control signal. The lookup table can include another column that includes information about a frequency band (e.g., a range of frequencies making up the frequency band). In some examples, the lookup table can include still another column that includes information about a frequency within a specific frequency guard band. The transceiver 118 can consult the lookup table to correlate the control signal information to a particular frequency guard band, frequency within the frequency guard band, or both. For example, memory 408 can include instructions for causing the transceiver 118 to consult the lookup table and select the frequency guard band, frequency within the frequency guard band, or both.

In some examples, the memory 408 can include a control module 414. The control module 414 can include instructions for receiving a control signal (e.g., from a computing device positioned at the well surface) or indicia of a user input (e.g., if the user programs the transceiver 118 prior to positioning the transceiver 118 in the wellbore 102). The control module 414 can include instructions for operating the frequency guard band selector module 410 based on the control signal or user input. For example, the control module 414 can cause the frequency guard band selector module 410 to select a specific frequency guard band that the transceiver 118 can use for wireless communications.

The transceiver 118 can include the power source 416. The power source 416 can be in electrical communication with the computing device 402, and the communications device 418. In some examples, the power source 416 can include a battery (e.g., for powering the transceiver 118). In other examples, the transceiver 118 can be coupled to and powered by an electrical cable (e.g., a wireline). Additionally or alternatively, the power source 416 can include an AC signal generator. The computing device 402 can operate the power source 416 to apply a transmission signal to the communications device 418. For example, the computing device 402 can cause the power source 416 to apply a voltage with a frequency to the communications device 418 for generating a wireless transmission.

In some examples, part of the communications device 418 can be implemented in software. For example, part of the communications device 418 can include instructions stored in memory 408. In some examples, the communications device 418 can be substantially the same as the communication device 142 of FIG.

The communications device 418 can include or can be coupled to an antenna. The communications device 418 can detect or receive wireless signals (e.g., from another transceiver or a computing device) via the antenna. In some examples, the communications device 418 can amplify, filter, modulate, frequency shift, and otherwise manipulate the detected signals. The communications device 418 can transmit a signal associated with the detected signals to the processor 404. In some examples, the processor 404 can receive and analyze the signal to retrieve data associated with the detected signals.

In some examples, the processor 404 can analyze the information and perform one or more functions. For example, the information can be from a control signal and can be indicative of a specific frequency guard band that the transceiver 118 should use for wireless communications. The processor 404 can receive the information and use the frequency guard band selector module 410 (or the control module 414) to select the specific frequency guard band for use in wireless communications.

In some examples, the communications device 418 can receive signals (e.g., associated with signals or information to be transmitted) from the processor 404 and amplify, filter, modulate, frequency shift, and otherwise manipulate the signals. The communications device 418 can transmit the manipulated signals to an antenna to generate wireless signals representative of the information.

In some examples, the transceiver 118 can include one or more sensors 424, 426. Examples of the sensors 424, 426 can include pressure sensors, temperature sensors, microphones, accelerometers, depth sensors, resistivity sensors, vibration sensors, ultrasonic transducers, fluid analyzers or sensors, and RFID readers. The sensors 424, 426 can transmit data to the processor 404 (e.g., for analysis or communication to other transceivers).

Figure 5:
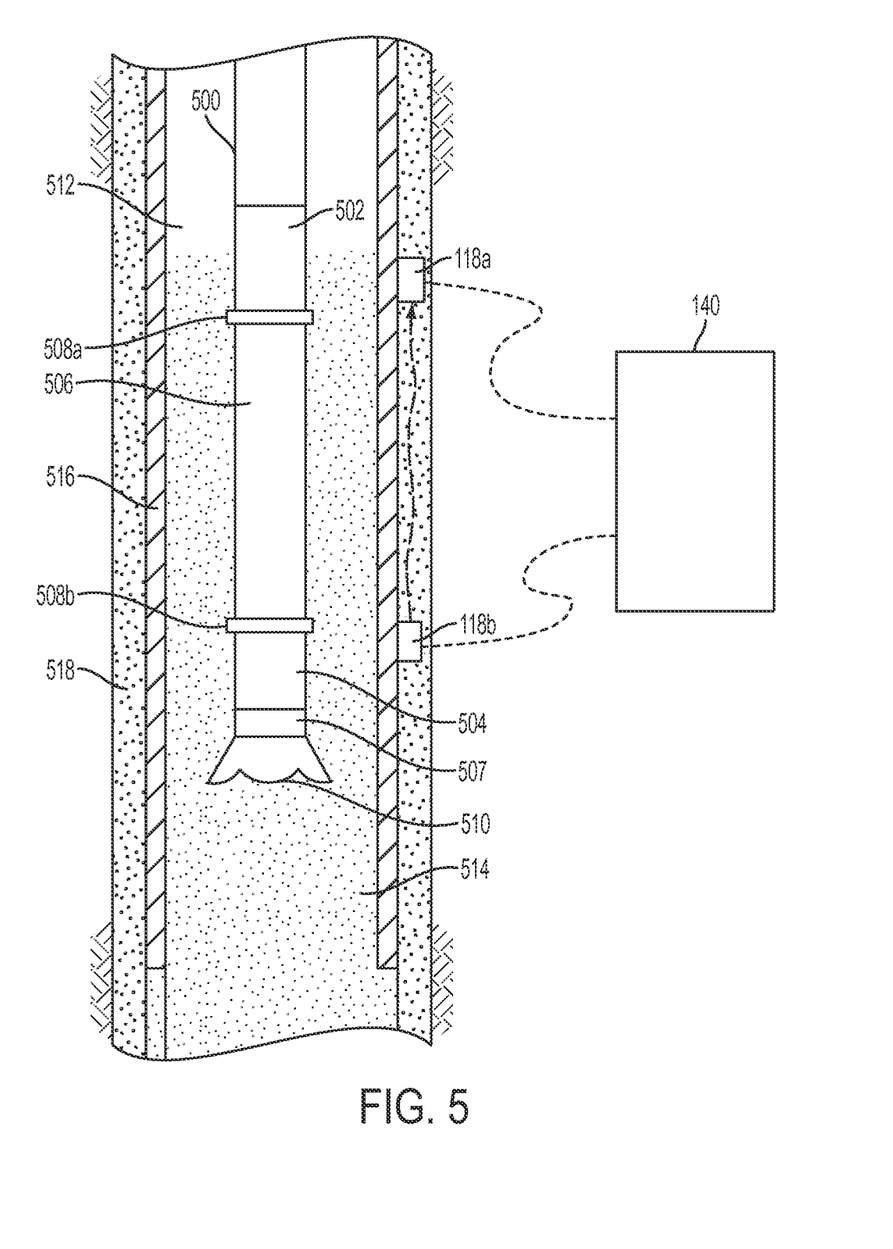
FIG. 5 is a cross-sectional side view of another example of part of a well system for downhole communications using frequency guard bands.

FIG. 5 is a cross-sectional side view of another example of part of a well system for downhole communications using guard bands. In this example, the well system includes a wellbore. The wellbore can include a casing string 516 and a cement sheath 518. The wellbore can include a fluid 514. The fluid 514 (e.g., mud) can flow in annulus 512 positioned between a well tool 500 and a wall of the casing string 516.

The well tool 500 (e.g., logging-while-drilling tool) can be positioned in the wellbore. The well tool 500 can include various subsystems 502, 504, 506, 507. For example, the well tool 500 can include a subsystem 502 that includes a communication subsystem. The well tool 500 can also include a subsystem 504 that includes a saver subsystem or a rotary steerable system. A tubular section or an intermediate subsystem 506 (e.g., a mud motor or measuring-while-drilling module) can be positioned between the subsystems 502, 504. In some examples, the well tool 500 can include a drill bit 510 for drilling the wellbore. The drill bit 510 can be coupled to another tubular section or intermediate subsystem 507 (e.g., a measuring-while-drilling module or a rotary steerable system).

The well tool 500 can also include tubular joints 508a, 508b. Tubular joint 508a can prevent a wire from passing between subsystem 502 and the intermediate subsystem 506. Tubular joint 508b can prevent a wire from passing between the other subsystem 504 and the intermediate subsystem 506. The tubular joints 508a, 508b may make it challenging to communicate information through the well tool 500. It may be desirable to communicate information externally to the well tool 500, for example, using transceivers 118a-b.

The transceivers 118a-b can be positioned external to the casing string 516. The transceivers 118a-b can be individually programmed to wirelessly communicate information over a specific frequency guard band. In some examples, each transceiver 118a-b can be programmed to wirelessly communicate over a different frequency guard band. In some examples, the transceivers 118a-b can be programmed to wirelessly communicate information over one or more specific frequencies within a frequency guard band. For example, each transceiver 118a-b can be programmed to wirelessly communicate over a different frequency within the frequency guard band.

Figure 6:
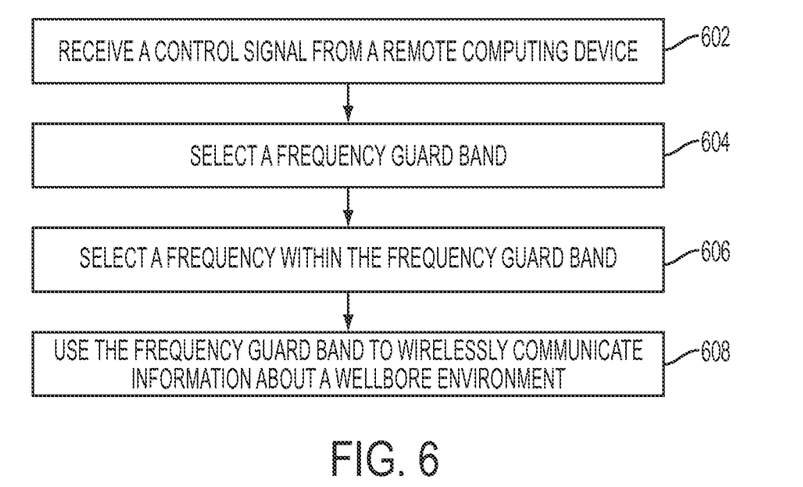
FIG. 6 is a flow chart depicting an example of a process for downhole communications using frequency guard bands.

FIG. 6 is a flow chart showing an example of a process for downhole communications using guard bands.

In block 602, a transceiver receives a control signal from a remote computing device. The remote computing device can be positioned in a wellbore, at a surface of the wellbore, or elsewhere in a well system. The control signal from the remote computing device can include information that can be interpreted by the transceiver. The transceiver can perform one or more functions (e.g., select a specific frequency guard band or select a particular frequency within a specific frequency guard band) based on the information.

In block 604, the transceiver can select a frequency guard band based on the control signal from the remote computing device. For example, the transceiver can include a lookup table stored in memory in which control signal information is correlated to one or more frequency guard bands. The transceiver (e.g., a processor within the transceiver) can access the lookup table and select a specific frequency guard band based on the control signal from the remote computing device. The transceiver can select the specific frequency guard band from among multiple available frequency bands. As another example, the transceiver can be pre-programmed to wirelessly communicate using the frequency guard band prior to being positioned in the wellbore. For example, the transceiver can select the frequency guard band based on user input.

The frequency guard band can include a (typically unused) range of frequencies separating two adjacent frequency bands that are used for wireless communications. The frequency guard band can separate the two adjacent frequency bands to reduce interference between wireless communications using the adjacent frequency bands.

In block 606, the transceiver can select a frequency within the frequency guard band based on the control signal. For example, the transceiver (e.g., a processor within the transceiver) can access a lookup table stored in memory in which control signal information is correlated to one or more frequencies within the frequency band selected in block 604. The transceiver can access the lookup table and select the frequency based on the control signal from the remote computing device. The transceiver can select the frequency from among multiple available frequencies within the frequency guard band. As another example, the transceiver can select the frequency, from among multiple available frequencies within the frequency guard band, based on user input.

In block 608, the transceiver uses the frequency guard band to wirelessly communicate information about the wellbore environment. For example, the transceiver can receive sensor information about the wellbore environment from a sensor. The sensor can include a pressure sensor, a temperature sensor, a microphone, an accelerometer, a depth sensor, a resistivity sensor, a vibration sensor, an ultrasonic transducer, a fluid analyzer or detector, and a RFID reader. The sensor can transmit the sensor information to a processor (e.g., within the transceiver). The transceiver can receive the sensor information and transmit the sensor information using the frequency guard band selected in block 604. For example, the transceiver can transmit the sensor information via the frequency selected in block 606 that is within the frequency guard band selected in block 604. In some examples, the transceiver can receive information about the wellbore from another transceiver via the frequency guard band (e.g., via the frequency selected in block 606) and relay the information about the wellbore to still another transceiver.

In some aspects, systems and methods for downhole communications using frequency guard bands are provided according to one or more of the following examples:

EXAMPLE #1

A system that is positionable in a wellbore can include a chain of transceivers. The chain of transceivers can be positionable external to a casing string. Each transceiver in the chain of transceivers can be operable to transmit a wireless signal using a separate frequency guard band assigned to that transceiver. Each transceiver in the chain of transceivers can also be operable to receive wireless signals using another frequency guard band assigned to a prior transceiver in the chain of transceivers.

EXAMPLE #2

The system of Example #1 may feature the frequency guard band including an unused range of frequencies that is between adjacent frequency bands for separating the adjacent frequency bands.

EXAMPLE #3

The system of any of Examples #1-2 may feature each transceiver in the chain of transceivers being operable to receive a control signal from a remote device and select the separate frequency guard band based on the control signal.

EXAMPLE #4

The system of any of Examples #1-3 may feature each transceiver in the chain of transceivers being remotely programmable subsequent to the transceiver being positioned in the wellbore.

EXAMPLE #5

The system of any of Examples #1-4 may feature each transceiver in the chain of transceivers including a processing device and a memory device. The memory device can store instructions executable by the processing device for causing the processing device to: (i) receive a control signal and (ii) select the frequency guard band and a particular frequency within the frequency guard band based on the control signal by consulting a lookup table store in the memory device in which the frequency guard band and multiple frequencies within the frequency guard band are mapped to multiple characteristics of the control signal.

EXAMPLE #6

The system of any of Examples #1-5 may feature each transceiver in the chain of transceivers being operable to transmit the wireless signal using acoustic waves, magnetic communications, or radio frequency communications.

EXAMPLE #7

The system of any of Examples #1-6 may feature each transceiver in the chain of transceivers being coupled with a sensor for acquiring data about an environment in the wellbore. The sensor can include a pressure sensor, a temperature sensor, microphone, or a fluid analyzer. The wireless signal can include the data about the environment in the wellbore.

EXAMPLE #8

The system of any of Examples #1-7 may feature each transceiver in the chain of transceivers being positionable within cement that is positioned between the casing string and a formation in which the wellbore extends.

EXAMPLE #9

The system of any of Examples #1-8 may feature each transceiver in the chain of transceivers being coupled to a formation in which the wellbore extends or an outer housing of the casing string.

EXAMPLE #10

A communication system that is positionable in a wellbore can include a first transceiver. The first transceiver can be positionable external to a casing string. The first transceiver can be programmable to wirelessly transmit data over a first frequency guard band. The first frequency guard band can include an used range of frequencies between adjacent frequency guard bands for separating the adjacent frequency guard bands. The communication system can also include a second transceiver. The second transceiver can be positionable external to the casing string. The second transceiver can be programmable to receive the data from the first transceiver over the first frequency guard band. The second transceiver can be programmable to wirelessly transmit the data to a third transceiver over a second frequency guard band.

EXAMPLE #11

The communication system of Example #10 may feature the first transceiver and the second transceiver each being programmable to wirelessly transmit the data using acoustic waves, magnetic communications, or radio frequency communications.

EXAMPLE #12

The communication system of any of Examples #10-11 may feature the first transceiver and the second transceiver each being remotely programmable subsequent to being positioned in the wellbore.

EXAMPLE #13

The communication system of any of Examples 10-12 may feature a computing device. The computing device can be positionable at a surface of the wellbore. The computing device can be operable to remotely program the first transceiver and the second transceiver by wirelessly transmitting respective control signals to the first transceiver and the second transceiver.

EXAMPLE #14

The communication system of any of Examples #10-13 may feature the first transceiver including a processing device and a memory device. The memory device can store instructions executable by the processing device for causing the processing device to: (i) receive a control signal and (ii) select the first frequency guard band and a particular frequency within the first frequency guard band based on the control signal by consulting a lookup table stored in the memory device in which the first frequency guard band and multiple frequencies within the first frequency guard band are mapped to multiple characteristics of the control signal.

EXAMPLE #15

The communication system of any of Examples #10-14 may feature the second frequency guard band being different from the first frequency guard band.

EXAMPLE #16

The communication system of any of Examples #10-15 may feature the first transceiver being coupled to a sensor. The sensor can include a pressure sensor, a temperature sensor, microphone, or a fluid analyzer for acquiring information about an environment in the wellbore. The data can include the information about the environment in the wellbore.

EXAMPLE #17

The communication system of any of Examples #10-16 may feature the first transceiver and the second transceiver being positionable within cement that is positioned between the casing string and a formation in which the wellbore extends.

EXAMPLE #18

The communication system of any of Examples #10-17 may feature the first transceiver and the second transceiver being coupled to a formation in which the wellbore extends.

EXAMPLE #19

The communication system of any of Examples #10-18 may feature the first transceiver and the second transceiver being coupled to an outer housing of the casing string.

EXAMPLE #20

A method can include receiving, by a programmable transceiver that is external to a casing string, a control signal from a remotely located computing device. The method can also include selecting, based on the control signal, a frequency guard band for use in transmitting a wireless communication. The frequency guard band can include an unused range of frequencies that is between adjacent frequency guard bands for separating the adjacent frequency guard bands. The method can also include transmitting, by the programmable transceiver, the wireless communication over the frequency guard band. The wireless communication can include data about an environment in the wellbore.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system that is positionable in a wellbore, the system comprising:
    a chain of transceivers that are positionable external to a casing string, each transceiver in the chain of transceivers being operable to transmit a wireless signal using a frequency guard band assigned to that transceiver and to receive wireless signals using another frequency guard band assigned to a prior transceiver in the chain of transceivers, wherein each transceiver in the chain of transceivers is further operable to receive a control signal from a remote device and select the frequency guard band based on the control signal.

2. The system of claim 1, wherein the frequency guard band comprises an unused range of frequencies that is between adjacent frequency bands for separating the adjacent frequency bands.

3. The system of claim 1, wherein each transceiver in the chain of transceivers is remotely programmable subsequent to the transceiver being positioned in the wellbore.

4. The system of claim 1, wherein each transceiver in the chain of transceivers comprises:
    a processing device; and
    a memory device in which instructions executable by the processing device are stored for causing the processing device to:
        receive the control signal; and
        select the frequency guard band and a particular frequency within the frequency guard band based on the control signal by consulting a lookup table stored in the memory device in which the frequency guard band and a plurality of frequencies within the frequency guard band are mapped to one or more characteristics of the control signal.

5. The system of claim 1, wherein each transceiver in the chain of transceivers transmits the wireless signal using acoustic waves, magnetic communications, or radio frequency communications.

6. The system of claim 1, wherein each transceiver in the chain of transceivers is coupled with a sensor for acquiring data about an environment in the wellbore, the sensor including a pressure sensor, a temperature sensor, microphone, or a fluid analyzer, and wherein the wireless signal comprises the data about the environment in the wellbore.

7. The system of claim 1, wherein each transceiver in the chain of transceivers is positionable within cement that is positioned between the casing string and a formation in which the wellbore extends.

8. The system of claim 1, wherein each transceiver in the chain of transceivers is coupled to a formation in which the wellbore extends or an outer housing of the casing string.

9. The system of claim 1, wherein the remote device is positioned at a surface of the wellbore.

10. A communication system that is positionable in a wellbore, the communication system comprising:
    a first transceiver that is positionable external to a casing string and programmable to wirelessly transmit data over a first frequency guard band, wherein the first frequency guard band comprises an unused range of frequencies between adjacent frequency bands for separating the adjacent frequency bands, and wherein the first transceiver is operable to receive a first control signal from a computing device and select the first frequency guard band based on the first control signal; and
    a second transceiver that is positionable external to the casing string and programmable to receive the data from the first transceiver over the first frequency guard band and to wirelessly transmit the data to a third transceiver over a second frequency guard band, wherein the second transceiver is operable to receive a second control signal from the computing device and select the second frequency guard band based on the second control signal.

11. The communication system of claim 10, wherein the first transceiver and the second transceiver can each wirelessly transmit the data using acoustic waves, magnetic communications, or radio frequency communications.

12. The communication system of claim 10, wherein the first transceiver and the second transceiver are each remotely programmable subsequent to being positioned in the wellbore.

13. The communication system of claim 12, wherein the computing device is positioned at a surface of the wellbore and operable to remotely program the first transceiver and the second transceiver by wirelessly transmitting the first control signal and the second control signal to the first transceiver and the second transceiver, respectively.

14. The communication system of claim 10, wherein the first transceiver comprises:
 a processing device; and
 a memory device in which instructions executable by the processing device are stored for causing the processing device to:
  receive the first control signal; and
  select the first frequency guard band based on the first control signal by consulting a lookup table stored in the memory device in which frequency guard bands are mapped to one or more characteristics of the first control signal.

15. The communication system of claim 10, wherein the second frequency guard band is different from the first frequency guard band.

16. The communication system of claim 10, wherein the first transceiver is coupled to a sensor that includes a pressure sensor, a temperature sensor, microphone, or a fluid analyzer for acquiring information about an environment in the wellbore, and wherein the data comprises the information about the environment in the wellbore.

17. The communication system of claim 10, wherein the first transceiver and the second transceiver are disposed within cement that is positioned between the casing string and a formation in which the wellbore extends.

18. The communication system of claim 10, wherein the first transceiver and the second transceiver are coupled to a formation in which the wellbore extends.

19. The communication system of claim 10, wherein the first transceiver and the second transceiver are coupled to an outer housing of the casing string.

20. A method comprising:
 receiving, by a programmable transceiver that is external to a casing string, a control signal from a remotely located computing device;
 selecting, by the programmable transceiver and based on the control signal, a frequency guard band for use in transmitting a wireless communication, wherein the frequency guard band comprises an unused range of frequencies that is between adjacent frequency bands for separating the adjacent frequency bands; and
 transmitting, by the programmable transceiver, the wireless communication over the frequency guard band, wherein the wireless communication comprises data about an environment in a wellbore.

\* \* \* \* \*